United States Patent
Lee et al.

(10) Patent No.: US 9,451,459 B2
(45) Date of Patent: Sep. 20, 2016

(54) CERTIFICATION METHOD USING AN EMBEDDED UICC CERTIFICATE, PROVISIONING AND MNO CHANGING METHODS USING THE CERTIFICATION METHOD, EMBEDDED UICC THEREFOR, MNO SYSTEM, AND RECORDING MEDIUM

(75) Inventors: Jinhyoung Lee, Seoul (KR); Yeumin Yoon, Seoul (KR); Sungchul Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 112 days.

(21) Appl. No.: 14/342,961

(22) PCT Filed: Sep. 4, 2012

(86) PCT No.: PCT/KR2012/007063
§ 371 (c)(1),
(2), (4) Date: Mar. 5, 2014

(87) PCT Pub. No.: WO2013/036010
PCT Pub. Date: Mar. 14, 2013

(65) Prior Publication Data
US 2014/0329502 A1 Nov. 6, 2014

(30) Foreign Application Priority Data

Sep. 5, 2011 (KR) .......... 10-2011-0089841
Oct. 12, 2011 (KR) .......... 10-2011-0104171

(51) Int. Cl.
*H04M 1/66* (2006.01)
*H04W 12/06* (2009.01)
(Continued)

(52) U.S. Cl.
CPC ............. *H04W 12/06* (2013.01); *H04W 12/04* (2013.01); *H04L 63/083* (2013.01); *H04L 63/0823* (2013.01); *H04W 4/001* (2013.01); *H04W 4/005* (2013.01)

(58) Field of Classification Search
CPC ... H04W 12/04; H04W 8/245; H04W 4/001; H04W 8/183; H04W 8/265; H04W 12/06; H04W 4/00; H04W 8/08; H04W 4/005; H04W 4/003; H04M 3/00; H04L 63/0823; H04L 63/083; H04L 9/3228; H04L 63/061; H04L 63/0869
USPC ........................................... 455/411
See application file for complete search history.

(56) References Cited

U.S. PATENT DOCUMENTS

2006/0079284 A1* 4/2006 Lu .................. H04W 92/08
455/558
2006/0251066 A1* 11/2006 Uusikartano ....... H04L 29/1232
370/389
(Continued)

FOREIGN PATENT DOCUMENTS

JP   2003-69560 A   3/2003
JP   2011-28522 A   2/2011
(Continued)

OTHER PUBLICATIONS

International Search Report for PCT/KR2012/007062 dated Jan. 30, 2013.
(Continued)

*Primary Examiner* — Mahendra Patel
(74) *Attorney, Agent, or Firm* — Sughrue Mion, PLLC

(57) ABSTRACT

The present invention relates to a system constituted by a mobile network operator (MNO), a subscription manager (SM), and an embedded UICC (eUICC), wherein the MNO system or the SM stores an eUICC certificate that can verify the identity of the eUICC, transfers the eUICC certificate to the MNO system or the SM in a provisioning or MNO changing process, verifies the identity of a corresponding eUICC using the received eUICC certificate, and encrypts and transfers a profile to the eUICC only if the verification is successful so that the eUICC may be verified during the provisioning or MNO changing processes.

16 Claims, 8 Drawing Sheets

(51) Int. Cl.
*H04W 12/04* (2009.01)
*H04W 4/00* (2009.01)
*H04L 29/06* (2006.01)

(56) References Cited

U.S. PATENT DOCUMENTS

| | | | | |
|---|---|---|---|---|
| 2009/0181662 | A1* | 7/2009 | Fleischman | H04W 8/245 455/419 |
| 2011/0077051 | A1* | 3/2011 | Brown | H04M 1/67 455/558 |
| 2011/0081950 | A1* | 4/2011 | Guven | H04W 12/08 455/558 |
| 2011/0092253 | A1* | 4/2011 | Amiel | H04W 8/265 455/558 |
| 2011/0252172 | A1* | 10/2011 | Sun | G06K 19/07 710/305 |
| 2012/0115455 | A1* | 5/2012 | Rao | H04W 12/06 455/418 |
| 2012/0260095 | A1* | 10/2012 | Von Hauck | H04L 9/3228 713/176 |
| 2012/0302284 | A1* | 11/2012 | Rishy-Maharaj et al. | 455/552.1 |
| 2013/0023235 | A1* | 1/2013 | Fan | H04W 48/18 455/411 |
| 2013/0132854 | A1* | 5/2013 | Raleigh | G06F 3/0482 715/738 |

FOREIGN PATENT DOCUMENTS

KR 10-2005-0090561 A 9/2005
KR 10-0822853 B1 4/2008

OTHER PUBLICATIONS

Written Opinion for PCT/KR2012/007063 dated Jan. 30, 2013.

* cited by examiner

CERTIFICATION METHOD USING AN EMBEDDED UICC CERTIFICATE, PROVISIONING AND MNO CHANGING METHODS USING THE CERTIFICATION METHOD, EMBEDDED UICC THEREFOR, MNO SYSTEM, AND RECORDING MEDIUM

TECHNICAL FIELD

The present invention relates to methods for processing subscription and changing mobile network operator (MNO) by using authentication information of an embedded universal integrated circuit card (hereinafter, referred to as 'eUICC'), an apparatus for the same, and an eUICC for the same.

BACKGROUND ART

An Universal Integrated Circuit Card (UICC) is a smart card which can be used as a module for authentication of a user as inserted in a terminal. The UICC may store personal information of a user and operator information about a Mobile Network Operation (MNO) which the user subscribes to. For example, the UICC may include an International Mobile Subscriber Identity (IMSI) identifying the user. Also, the UICC may be referred to as a Subscriber Identity Module (SIM) card for Global System for Mobile communications (GSM), or a Universal Subscriber Identity Module (USIM) card for a Wideband Code Division Multiple Access (WCDMA).

When a user inserts a UICC into a terminal of the user, authentication of the user can be automatically performed by using the information stored in the UICC so that the user can conveniently use the terminal. Also, when a user desires to substitute an old terminal with a new terminal, the user can easily substitute the old terminal with the new terminal by inserting a UICC removed from the old terminal into the new terminal.

When terminals which are required to be miniaturized, for example, terminals for Machine-to-Machine (M2M) communications, are manufactured as having a structure for removable UICC, it becomes difficult to miniaturize the terminals. Therefore, an embedded UICC (eUICC), a non-removable UICC has been proposed. Information about a user using the eUICC is stored in the UICC in a form of IMSI.

Since a conventional UICC is implemented as a removable card, a user can open a terminal without a limit to types of terminals or MNOs. However, an IMSI in the eUICC of a terminal can be assigned when the terminal is used only for a specific mobile network operator designated in the manufacturing step of the terminal. Thus, an MNO placing an order for terminals and a manufacturer of the terminals should consider a stock inventory of manufactured terminals, and which becomes a reason of increasing sale prices of terminals. Also, users have inconveniency in changing a mobile network operator to which they subscribe to. Therefore, demanded is a method of opening a terminal by a user without regard to a mobile network operator of his terminal.

On the other hand, according to the recent introduction of the eUICC, it becomes necessary to update information about subscribers of various mobile network operators in a UICC remotely. Accordingly, a Subscription Manager (SM) or a Profile Manager (PM) for management of information about subscribers is being discussed.

It is being discussed that the SM is responsible for functions such as management of information about eUICC, information about various mobile network operators, authentication on change of mobile network operator, a remote information change, etc. However, details of the functions and roles of the SM has not been defined yet.

Also, since a plurality of MNOs, SMs, device vendors and USIM vendors are related to each other in an eUICC environment, reliability of each entity is required to be checked in procedures of subscription and MNO change. However, a detail method for this does not exist.

DISCLOSURE

Technical Problem

The present invention provides a method of subscribing and changing MNO using a certificate, in a communication environment including an embedded universal integrated circuit card (eUICC), and an eUICC for the same.

The present invention also provides a method of pre-installing an eUICC certificate which can be reliably verified by an MNO and a SM (including a SM-SR and a SM-DP) in the eUICC.

The present invention also provides a method of making certificate information for verifying an eUICC identity, verifying that the eUICC is trustable by an MNO and a SM, or verifying that it is possible to perform MNO services be included in the eUICC.

The present invention also provides a method of issuing a certificate for verifying an eUICC by a specific system in a trusted sector.

The present invention also provides a method of generating an eUICC certificate for verifying an eUICC identity between an MNO and a SM-SR, and storing/managing the eUICC certificate in the eUICC beforehand.

The present invention also provides a method of performing trustable subscription and MNO change (or, subscription change) procedures by using such the eUICC certificate.

Technical Solution

An example embodiment of the present invention provides a method of certificating an embedded universal integrated circuit card (eUICC) cooperating with a mobile network operator (MNO) system and a subscription manager (SM), the method comprising storing, by the eUICC, an eUICC certificate used for the MNO system or the SM to verify an identity of the eUICC; and transmitting, by the eUICC, the eUICC certificate to the MNO system or the SM.

Other example embodiment of the present invention provides an embedded universal integrated circuit card (eUICC) cooperating with an external entity including a mobile network operator (MNO) system and a subscription manager (SM), wherein the eUICC stores an eUICC certificate profile including at least one of an eUICC certificate, which is used for the MNO system or the SM to verify an identity of the eUICC, card operating system (OS) information, card platform information, personal identification number (PIN) information, wherein the eUICC certificate profile transmits the eUICC certificate to the MNO system of the SM.

Other example embodiment of the present invention provides a method of provisioning an eUICC certificate which is used for a mobile network operator (MNO) system and a subscription manager (SM) to verify an identity of the eUICC by using the eUICC cooperating with an external entity including the MNO system and the SM, the method comprising receiving and storing, by the eUICC, the eUICC certificate generated in a manufacturing step of the eUICC;

transmitting, by the eUICC, the eUICC certificate to the MNO system; verifying, by the MNO system, the identity of the eUICC by using the eUICC certificate; and encrypting, by the MNO system, its operational profile and transmitting the operational profile to the eUICC.

Other example embodiment of the present invention provides a method of changing MNO using an eUICC cooperating with an external entity including a mobile network operator (MNO) system and a subscription manager (SM) and including an eUICC certificate which is used for the MNO system and the SM to verify an identity of the eUICC, the method comprising receiving and storing, by the eUICC, the eUICC certificate generated in a manufacturing step of the eUICC; transmitting, by the eUICC, the eUICC certificate to a receiving MNO system; verifying, by the receiving MNO system, the identity of the eUICC by using the eUICC certificate; encrypting, by the receiving MNO system, its operational profile and transmitting the operational profile to the eUICC; and notifying, by the eUICC, a fact that an MNO is changed, to the receiving MNO system and a donor MNO system.

Other example embodiment of the present invention provides a method of provisioning by using an embedded universal integrated circuit card (eUICC) cooperating with a mobile network operator (MNO) system, a subscription manager-data preparation (SM-DP) and a subscription manager-secure routing (SM-SR) constituting a subscription manager (SM), the method comprising receiving and storing, by the eUICC, an eUICC certificate which can verify an identity of the eUICC, from an eUICC manufacturer system or a terminal manufacturer system, in the eUICC; transmitting an activation request message or an opening request message to the MNO system according to an opening request of a subscriber; receiving, by the MNO system, the eUICC certificate when the MNO system performs status requests and technical capability control for the eUICC; transmitting, by the MNO system, the eUICC certificate to the SM-SR when the MNO system collects information related to a terminal from the SM-SR; and encrypting, by the MNO system, its operational profile and transmitting the operational profile to the eUICC only when the MNO system or the SM-SR verifies the eUICC using the eUICC certificate.

Other example embodiment of the present invention provides a method of changing MNO by using an embedded universal integrated circuit card (eUICC) cooperating with a mobile network operator (MNO) system, a subscription manager-data preparation (SM-DP) and a subscription manager-secure routing (SM-SR) constituting a subscription manager (SM), the method comprising receiving and storing, by the eUICC, an eUICC certificate which can verify an identity of the eUICC, from an eUICC manufacturer system or a terminal manufacturer system, in the eUICC; transmitting, by the eUICC, an activation request message or an opening request message to a receiving MNO system according to an MNO change request; receiving, by the receiving MNO system, the eUICC certificate from the eUICC when the receiving MNO system performs status requests and technical capability control for the eUICC; transmitting, by the receiving MNO system, the eUICC certificate to the SM-SR when the receiving MNO system collects information related to a terminal from the SM-SR; performing, by the receiving MNO system, negotiation and transferring right for MNO change with a donor MNO system; and encrypting, by the receiving MNO system, its operational profile and transmitting the operational profile to the eUICC, only when the receiving MNO system or the SM-SR verifies the eUICC using the eUICC certificate.

Other example embodiment of the present invention provides an embedded universal integrated circuit card (eUICC) cooperating with a mobile network operator (MNO) system and a subscription manager (SM) and managing an operational profile for the MNO, wherein the eUICC receives and stores an eUICC certificate generate in a manufacturing step of the eUICC, transmits the eUICC certificate to the MNO system, receives and decrypts the encrypted operational profile transmitted from the MNO system.

Other example embodiment of the present invention provides an MNO system cooperating with a subscription manager (SM) and an embedded universal integrated circuit card (eUICC), wherein the MNO system receives an eUICC certificate which can verify an identity of the eUICC from the eUICC during a provisioning or MNO change procedure, verifies the identity of the eUICC using the eUICC certificate, encrypts and transmits its operational profile to the eUICC.

Other example embodiment of the present invention provides a recording medium in which a program, which is installed in an embedded universal integrated circuit card (eUICC) cooperating with a mobile network operator (MNO) system and a subscription manager (SM), and can perform a function of storing an eUICC certificate used for the MNO system or the SM to verify an identity of the eUICC and a function of transmitting the eUICC certificate to the MNO system or the SM, is recorded.

Other example embodiment of the present invention provides a recording medium in which a program, which is installed in an embedded universal integrated circuit card (eUICC) cooperating with a mobile network operator (MNO) system and a subscription manager (SM), and can perform a function of receiving and storing an eUICC certificate generated in a manufacturing step of the eUICC, a function of transmitting the eUICC certificate to the MNO system, and a function of receiving and decrypting the encrypted operational profile transmitted from the MNO system, is recorded.

MODES OF THE INVENTION

Figure 1:
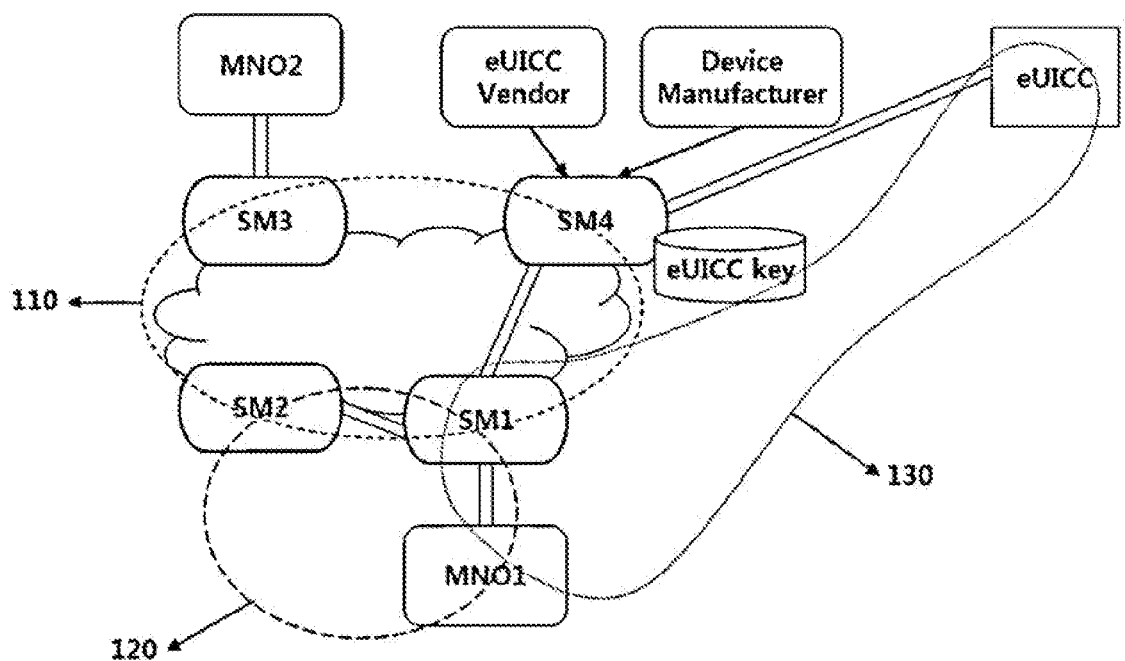
FIG. 1 illustrates an overall service architecture including an eSIM (eUICC) to which the present invention is applied.

Hereinafter, exemplary embodiments of the present invention will be described will be described with reference to the accompanying drawings. In the following description, the same elements will be designated by the same reference numerals although they are shown in different drawings. Furthermore, in the following description of the present embodiment, a detailed description of know functions and configurations incorporated herein will be omitted when it may make the subject matter of the present embodiment unclear.

A Machine-to-Machine (M2M) terminal which is being discussed currently in a Global Systems for Mobile communications association (GSMA) should have a small size according to its characteristic. However, when a conventional UICC is used for the M2M terminal, a module for installing the UICC in the M2M terminal should be prepared separately. Thus, miniaturization of the M2M terminal becomes difficult if the M2M terminal is manufactured in a form having a structure of a removable UICC.

Therefore, a structure of an embedded UICC (eUICC) which is non-removable is being discussed. In this case, information about a mobile network operator (MNO) using the eUICC should be stored in the eUICC in a form of International Mobile Subscriber Identity (IMSI).

However, an IMSI in the eUICC of a terminal can be assigned when the terminal is used only for a specific mobile network operator designated in the manufacturing step of the terminal Thus, an MNO placing an order for terminals and a manufacturer of the terminals should consider a stock inventory of manufactured terminals, and which becomes a reason of increasing sale prices of terminals. These problems are being big obstacles to expanding bases of M2M terminals.

As described above, as opposed to the conventional removable SIM, an embedded SIM (hereinafter, referred to as 'eSIM' or 'eUICC') has many issues such as an authority of opening, an initiative on value-added services, security of subscriber information, and so on. For these, international standardization organizations such as a GSMA and a European Telecommunication Standards Institute (ETSI) are performing standardization on necessary elements including top structures by interworking with related entities such as operators, manufacturers, SIM vendors, etc. A subscription manager (SM) is being focused upon in the standardization organizations as a main issue of the standardization on the eSIM. The SM means an entity or a function/role of performing overall managements on the eSIM such as issuing important profiles (referred to as 'Operator Credentials', 'MNO Credentials', 'Profile', 'eUICC Profile', 'Profile packages', etc.), and processing a procedure of subscription change, etc.

Recently, the GSMA proposed a structure in which the SM is divided into a SM-Data Preparation (SM-DP) performing a role of generating operator information and a SM-Secure Routing (SM-SR) performing a role of direct delivery of the operator information. However, detail, technical, and actual issuing mechanism has not been mentioned.

Therefore, in the present invention, a method of managing eSIM using generation of a dynamic encryption key (such as a public key, etc.) is proposed in the above described environment of separated roles of SM defined in the GSMA.

In this specification, the terminologies 'eSIM' and 'eUICC' are used as an identical concept.

The eSIM is a technology of SIM having a new concept. In a step of manufacturing a terminal, an IC chip is attached on a circuit board of the terminal, and SIM data (such as information about opening, value-added services, etc.) in a form of software are issued via Over-The-Air (OTA) or offline interface (such as connection with a PC based on a universal serial bus (USB), etc.). The IC chip used for the eSIM generally supports a hardware-based Crypto Co-Processor (CCP), generates a hardware-based public key, and provides application programming interfaces (API) which can be utilized by an application (for example, applet) to a SIM platform (for example, Java card platform, etc.). The Java card platform is one of platforms in which multiple applications are installed and which provides service in a smart card.

Due to a restricted memory space of the IC chip and security issues, applications cannot be installed by everyone in the SIM. Accordingly, a SIM service management platform for installation and management of applications in the SIM is needed in addition to the platform of applications. The SIM service management platform may issue data in a memory region of the SIM through authentication and security using a management key. A GlobalPlatform, a Remote File Manager (RFM), and a Remote Application Manager (RAM) which are specified in ETSI TS 102.226 are standard technologies for the SIM service management platform.

The SM, one of important elements of an eSIM environment, acts a role of remotely issuing data of communication and value-added services through a management key (such as a UICC OTA key, a Global Platform Issuer Security Domain (GP ISD) key, etc.).

Here, the management key (an eSIM management key or an eUICC management key) is used to deliver operator information securely to the eSIM as an access authentication key, and differentiated from an encryption key (a public key, etc.) which is mainly described in the present invention. The management key may also be represented as 'eUICC access credentials' which will be explained later.

In the GSMA, a role of the SM is classified into a SM-DP and a SM-SR. The SM-DP may perform a role of safely building an operation profile (or, operator information), IMSI, K, OPc, value-added service applications, and value-added service data and making a credential package for them. The SM-SR may perform a role of downloading safely the credential package generated by the SM-DP to the eSIM via SIM remote management technologies such as an OTA, a GP Secure Communication Protocol (GP SCP), etc.

Also, a structure of a 'Circle of Trust' shown in FIG. 1, which has a concept that an end-to-end trusted relation between an MNO and an eSIM is established based on overlapped trusted relations between each similar entity and entities, has been proposed. That is, a first MNO (MNO1) forms a trusted relation with a first SM (SM1), the first SM (SM1) forms a trusted relation with a fourth SM (SM4), and the fourth SM (SM4) forms a trusted relation with the eSIM. Accordingly, the trusted relation between the MNO and the eSIM may be established.

Before explaining the present invention, terminologies used in this specification are explained.

A 'MNO' means a mobile network operator, an entity providing mobile communication services to its customers through mobile networks.

Also, a 'SM' means a subscription manager, and performs a function of managing an eUICC.

Also, an 'eUICC supplier' means a provider of an eUICC module and resident software (such as a firmware, an operating system, etc.).

Also, a 'device vendor' means a provider of devices (that is, terminals) which require an UICC (or, an eUICC), especially, devices including a function of a wireless modem for a mobile network operated by an MNO.

Also, a 'provisioning' means a procedure of loading a profile into an eUICC, and a provisioning profile means a profile used for a device to access a communication network for the purpose of provisioning other provisioning profiles or operational profiles.

Also, a 'subscription' means a commercial relationship between a subscriber and a mobile communication service provider (an MNO) providing services to the subscriber.

Also, 'eUICC access credentials' mean data in an eUICC, used for setting up secured communications between the eUICC and an external entity to manage profiles in the eUICC.

Also, 'profile access credentials' mean data in a profile or the eUICC, used for setting up secured communications between the eUICC and an external entity to protect or manage a profile structure and data of the profile.

Also, a 'profile' means all information which can exist in the eUICC, a file structure which can be provisioned to the eUICC, or managed in the eUICC, combinations of data and applications. The profile may include an operational profile (that is, operator information), a provisioning profile (a profile for provisioning), a profile for other policy control functions (PCF), and so on.

Here, an 'operational profile' or 'operator information' means all kinds of profiles related to an operational subscription.

FIG. 1 illustrates an overall service architecture including an eSIM (eUICC) to which the present invention is applied.

The entire system may be explained as follows.

An eUICC system architecture to which the present invention is applicable may comprise a plurality of MNO systems, at least one SM system, an eUICC vendor system, a system of a manufacturer of a device equipped with an eUICC, and an eUICC. Explanations on each entity are as follows.

In FIG. 1, a dotted line represents a circle of trust, and a line comprising two full lines means a secured link.

If a scenario in which subscription information is stored and delivered is needed, it should be performed under authorization of an MNO and control of the MNO. Only one active profile should exist in a single eUICC at a certain time. At this time, the active profile means a profile added to a single HLR at the certain time.

An MNO and an eUICC should be able to decode MNO credential information, that is, profiles (an operational profile, a provisioning profile, etc.). The only exception for this may be a third party organization trusted by a specific MNO, for example, a SIM vendor. However, it is not a general function of the third party organization for performing the function.

A subscription cannot be switched in an eUICC when it is out of an operational policy control. A user should know any change in an MNO context and its activated subscription, be able to avoid a security danger, and require a security level up to a degree of competing with a current UICC model.

MNO credentials or a profile may mean subscription credentials including K, an algorithm, parameters for an algorithm, a value-added service application, value-added service data, etc.

A delivery of the MNO credentials or the profile should be performed from end to end in a secured manner. The delivery may be performed with continuous steps which do not break a security chain, and all the steps in the delivery chain should be performed under identification and authorization of an MNO. Although any entities in the delivery chain should not be able to identify the MNO credentials, the only exception is a third party organization trusted by a specific MNO, for example, a SIM vendor. However, it is not a general function of the third party organization.

An operator should have a complete right in controlling its credentials, and have strong rights in directing and controlling SM operations.

The SM functions should be provided by an MNO or a third-party organization. If they are provided by a third-party organization, there may be a commercial relationship between the SM and the MNO.

For managing subscriptions, the SM does not have any direct relationships with subscribers of an MNO. Although an MNO is required to have relationships with subscribers and to be an entry point for customer subscription, it is intended that the MNO go along with a contact between a M2M service provider (that is, a subscriber of the MNO) and customers of the M2M service provider.

When MNOs are being swapped, a donor MNO and a receiving MNO may have a previously made contract or not. A mechanism for approving the previous contract is necessary. A function of policy control of the donor operator may define a condition for removing it credentials, and a policy control function (PCF) may implement such the function.

The architecture introduces a function defined as a SM, and a main role of the SM is preparing a package or a profile including MNO credentials and delivering it to an eUICC. The function of a SM may be provided directly by an MNO. Or, an MNO may make a contract with a third-party organization in order to obtain a SM service.

A role of the SM may be divided into two sub functions such as a SM-SR and a SM-DP.

Actually, the functions of SM-SR and SM-DP may be provided by different entities or a single entity. Therefore, a boundary between the functions of SM-SR and SM-DP is required be set clearly, and interfaces between the two entities are required to be defined.

The SM-DP may be responsible for securely preparing a package or profile to be delivered to an eUICC, and interwork with the SM-SR for actual transmission of the package or profile. The core functions of the SM-DP are as follows. In addition to the following functions, additional functions may be added later.

1) Managing functional characteristics and certification level of an eUICC

2) Managing MNO credentials and profiles (for example, they include at least one of IMSI, K, additional service applications, and additional service data. Also, some of them may be enciphered by an MNO.)

3) Calculating an OTA package for downloading by the SM-SR

If the functions of the SM-DP are provided by a third-party organization, security and trusted relationship may become more important. In addition to a function of a real-time provisioning, the SM-DP may have a function of background processing to a not inconsiderable extent. Also, it is predicted that requirements on performance, scalability, and reliability of the SM-DP become more important.

The SM-SR may be responsible for a role of routing and delivering the credential package to a corresponding eUICC safely. The core functions of the SM-SR are as follows.

1) Managing OTA communications with an eUICC through a ciphered virtual private network (VPN)

2) Managing communication with another SM-SR to form an end-to-end path to an eUICC 3) Managing eUICC data used for SM-SR OTA communications provided by an eUICC supplier 4) Protecting communications with an eUICC by filtering only allowed entities (that is, a function of fire wall)

A SM-SR database may be provided by an eUICC vendor, a device (such as a M2M terminal, etc.) vendor, and, potentially, an MNO, and may be used by an MNO through a SM-SR mesh network.

The circle of trust may enable an end-to-end secured link during the delivery of a provisioning profile, and the SM-SR may share the circle of trust for a safe routing of the provisioning profile and an eUICC discovery. An MNO may be linked to SM-SR and SM-DP entities in the circle of trust, or, the MNO may provide these functions autonomously. In order to prevent an illegal use of an eUICC (such as cloning, illegal uses of credentials, service denying, illegal MNO context change, etc.) without violation of duties based on contracts or regulations, a secured end-to-end link between an eUICC and MNO credential is required.

That is, in FIG. 1, a notation 110 may represent a circle of trust formed between SMs, more specifically a circle of trust formed between SM-SR members, and a notation 120 may represent a circle of trust between MNO partners, and a notation 130 may represent an end-to-end secure link.

Figure 2:
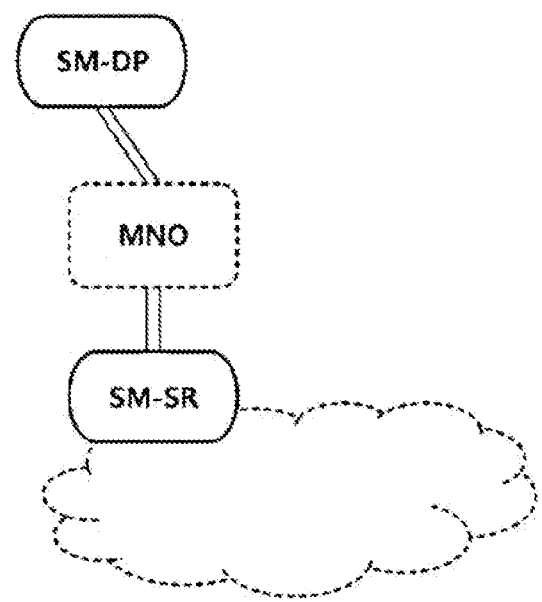
FIG. 2 illustrates a configuration in which a SM-SR and a SM-DP are located in a system, in an environment in which a role of SM is separated.

FIG. 2 illustrates a configuration in which a SM-SR and a SM-DP are located in a system, in an environment in which a role of SM is separated.

As shown in FIG. 2, a SM may be divided into a SM-DP which safely prepares various profiles related to an eUICC (such as an operational profile of an MNO, a provisioning profile, etc.) and a SM-SR for routing them. Also, the SM-SR may interwork with other multiple SM-SRs with trusted relationships, and the SM-DP may interwork with an MNO system.

Of course, arrangement of the SM-DP and the MNO system may be implemented differently from the case of FIG. 2. That is, the SM-DP may interwork with the SM-SR, and the MNO system may interwork with the SM-DP.

Under the above described eUICC system architecture, an eUICC according to an example embodiment of the present invention may comprise a mechanism of guaranteeing integrity, confidentiality, and authenticity for loading various profiles (such as a provisioning profile, an operational profile, etc.). As an example of the mechanisms, an encoding/decoding mechanism using a public key and a private key of an eUICC as profile access credentials and an electronic signature mechanism using a public key and a private key of a SM may be included selectively.

In other words, various profiles should be protected very safely in an eUICC architecture through a safe mechanism which can guarantee integrity, confidentiality, and authenticity. Accordingly, a safe mechanism for protecting the profiles is needed since the profiles are transmitted to an eUICC (not provisioned in a manufacturing step).

An eUICC according to an example embodiment of the present invention may manage or handle various profiles (such as a provisioning profile, an operational profile, etc.) by using profile access credentials in the eUICC.

More specifically, in the present invention, an eUICC have at least one set of profile access credentials (for example, a public key of an eUICC, etc.) for securely provisioning various profiles transmitted from an end point (for example, a SM) such as a provisioning profile, an operational profiles, etc. Also, the eUICC may decode a ciphered profile transmitted by an external entity by using the profile access credentials, as will be explained in a following example embodiment.

In addition, in an example embodiment of the present invention, only a single active profile is preferred to exist in an eUICC. A profile or profile management data should be transmitted between an end point reliably connected to an operating system having the profile or the profile management data and an eUICC. Also, the profile of the profile management data cannot be accessed by an external entity such as a device or a terminal. For this, in an example embodiment of the present invention, a method using an eUICC public key as profile access credentials, which can encode/decode the profile of the profile management data, is included.

In the specification, profile access credentials mean data used for decoding a profile received from an external entity such as a SM or an MNO, and is not limited to the terminology. That is, it may be represented using a different terminology such as profile installation credentials, profile installer credentials, etc. which can perform the same function.

Figure 3:
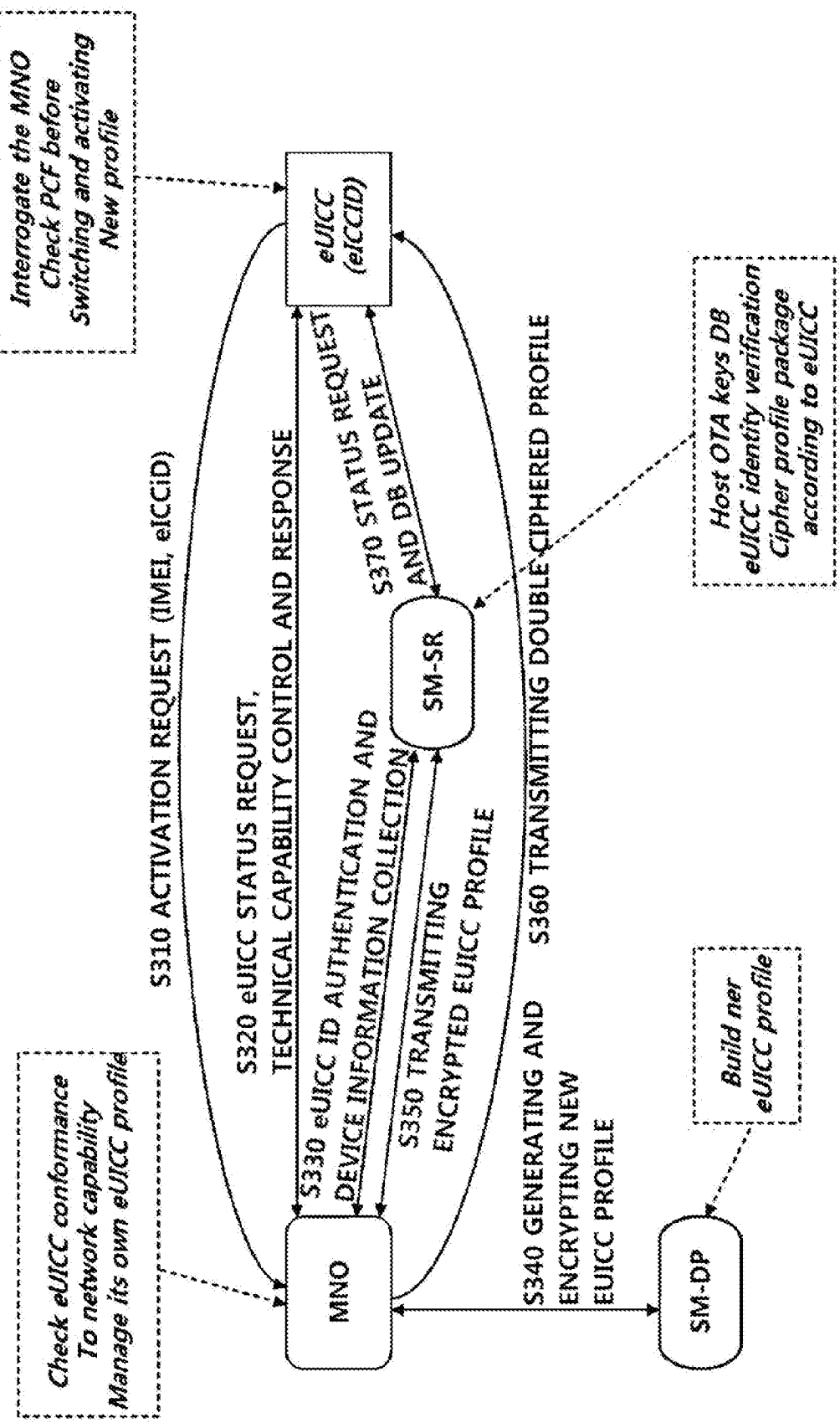
FIG. 3 is a flow chart to explain a provisioning procedure corresponding to a first subscription in a system to which the present invention is applied.

FIG. 3 is a flow chart to explain a provisioning procedure corresponding to a first subscription in a system to which the present invention is applied.

In the provisioning procedure, an eUICC may transmit an activation request including device identification information (such as IMEI, etc.) and eUICC identification information (such as eICCid, etc.) to an MNO (at S310). Then, a request of an eUICC status and request/confirmation of a technical capability control are performed (at S320).

Also, although not illustrated in FIG. 3, a step, in which the eUICC provides its public key (PK) or key information of PKI (information about a key generation algorithm, a key length, a key generation manner, etc.) to a corresponding MNO system or a SM-SR, may be included in the step S320.

In the step S330, the MNO may verify an identity of the eUICC and collect information about the eUICC by cooperating with the SM-SR. In the step S330, the MNO may obtain an encryption key for the eUICC, specifically, a public key corresponding to the eUICC from the SM-SR.

The obtaining the public key may be performed statically or dynamically. When the obtaining is performed statically, a public key and a private key can be generated in the eUICC in the manufacturing step of the eUICC. Specifically, a CCP in the eUICC may generate the public key and the private key. The private key may be stored in the eUICC, and the public key may be shared by all SM-SRs so that all the SM-SRs can recognize the public key for the eUICC and a SM-SR corresponding to the eUICC can transmit the public key for the eUICC to the MNO in response to a request of the MNO.

Figure 8:
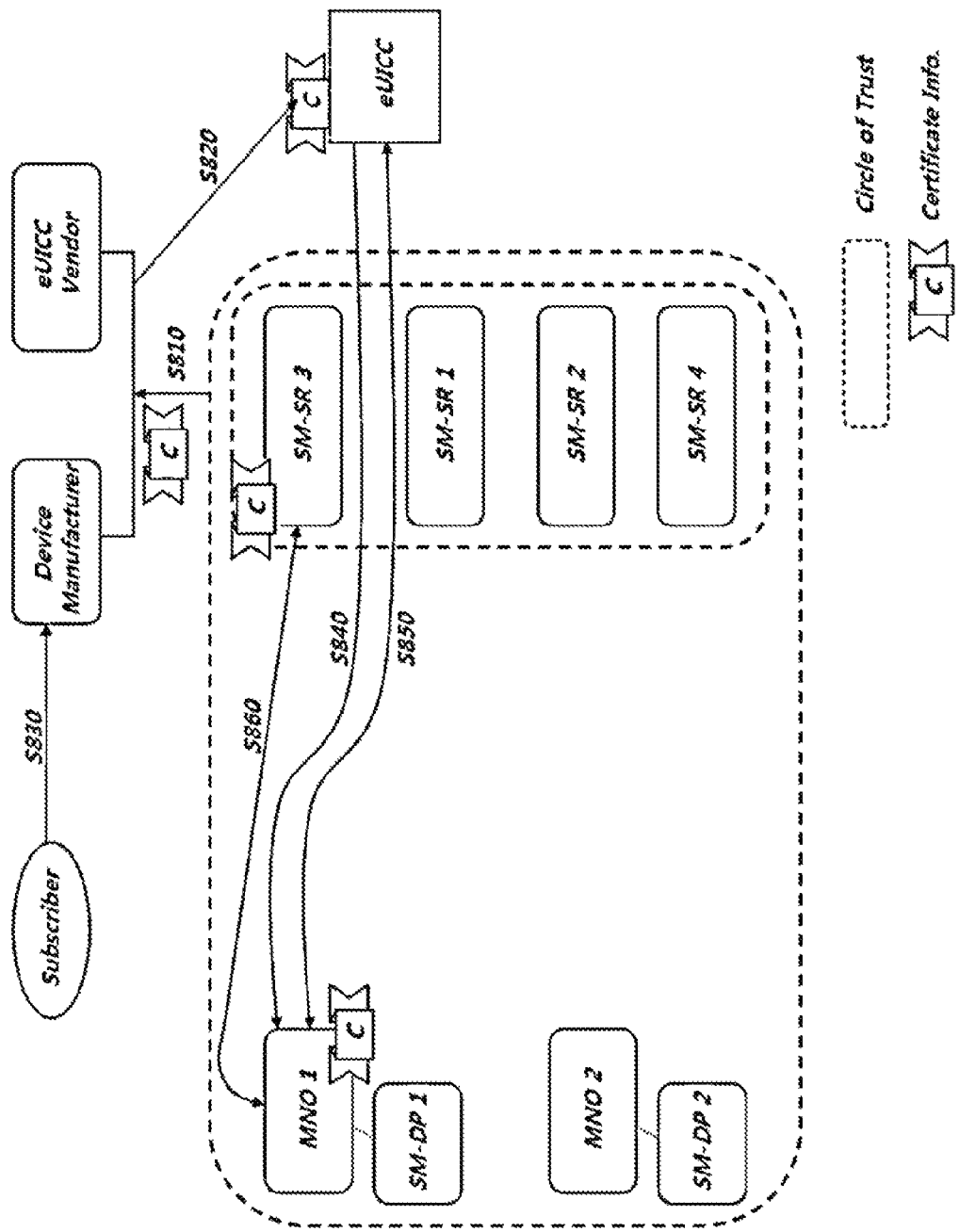
FIG. 8 illustrates a provisioning procedure using an eUICC certificate according to another example embodiment of the present invention.
Figure 9:
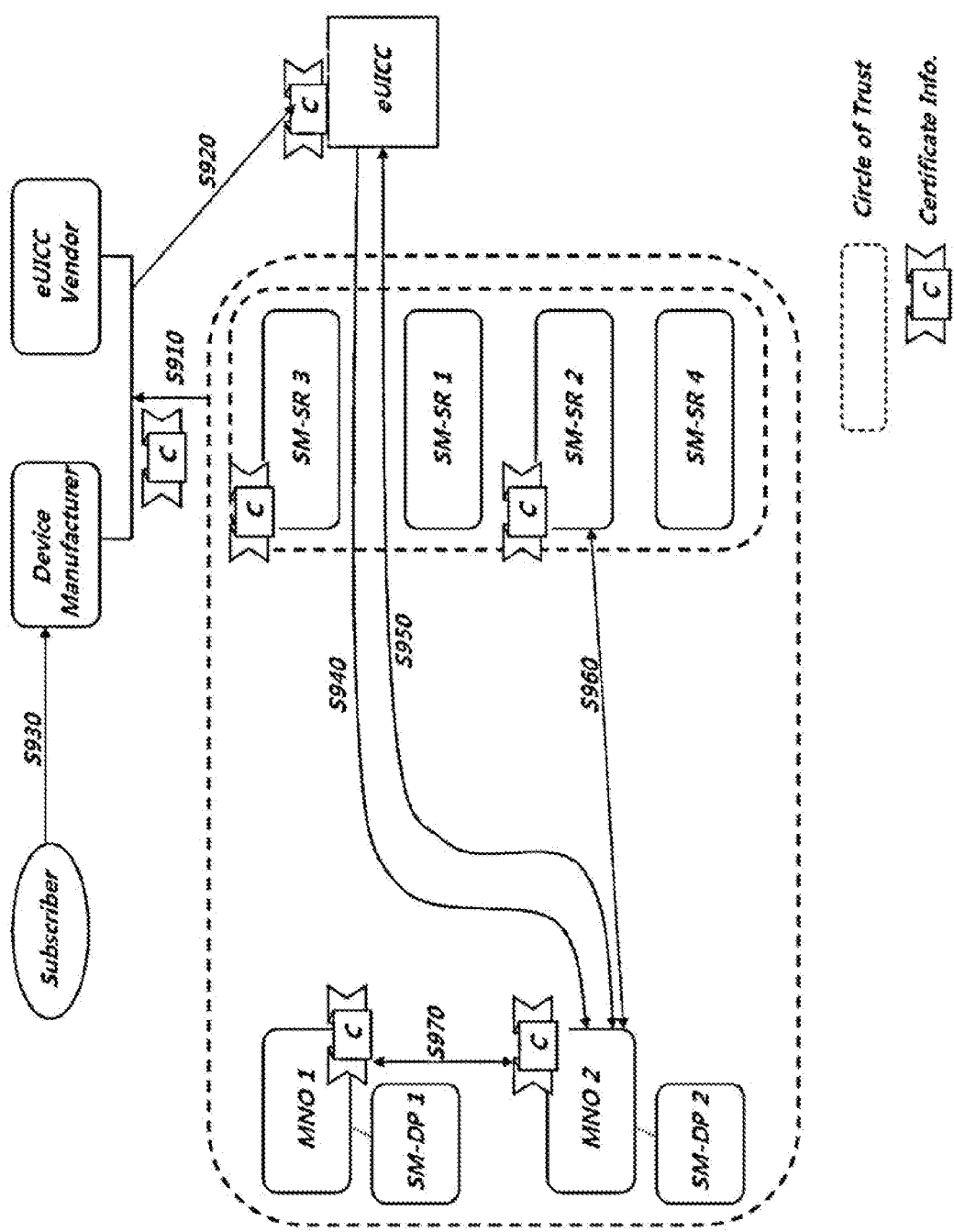
FIG. 9 illustrates a procedure of MNO change using an eUICC certificate according to another example embodiment of the present invention.

The dynamic procedure of obtaining the encryption key, which will be explained by referring to FIGS. 8 and 9, is that a SM-SR requests the eUICC to transmit a public key when there is a request (including identification information of the specific eUICC) from an MNO. In this case, the eUICC may generate the public key by using an issuance processing module in a terminal equipped with the eUICC and a security module in the eUICC, and transmit the generated public key to the SM-SR. Here, the issuance processing module may be also referred to as a communication module, a provisioning module, an issuance module, an opening module, etc. without being limited to a specific terminology. That is, the issuance processing module may perform a role of communicating with the outside of the terminal and management of a provisioning. Also, the security module may be also referred to as an encryption key generation module, an encryption key processing module, a security policy module, a credential manager, a profile manager, and so on. That is, the security module may perform generation of an encryption key and a security computation using the encryption key. The above procedure will be explained in further detail in the following description.

Here, a single security module may be commonly installed in the eUICC in the manufacturing step of the eUICC or later according to an eUICC policy. Alternatively, according to an eUICC policy and a policy of each MNO, multiple security modules may be installed for each MNO.

The MNO which has obtained the public key (the encryption key) of the corresponding eUICC may generate a new eUICC profile corresponding to the MNO through the SM-DP, encrypt the profile using the obtained public key, and deliver the encrypted profile to the MNO (at S340; a first encryption step). At this time, the SM-DP may generate an additional electronic signature by using its private key in order to provide authenticity. That is, the SM-DP may make an electronic signature on the profile by using its private key for authentication (at S340).

Then, the MNO may deliver the first encrypted eUICC profile to the SM-SR, and request a second encryption. The SM-SR may perform the second encryption on the eUICC profile by using the eUICC management key (such as an eUICC OTA key, a GP ISD key, etc.) which has been already stored, and deliver the second encrypted profile to the MNO (at S350).

Then, the MNO may transmit the double ciphered eUICC profile to the corresponding eUICC (at S360). At this time, the public key of the SM-DP or a certification may be transmitted to the eUICC with the eUICC profile in order to provide authenticity.

Since the eUICC already knows the eUICC management key, the eUICC may completely decode the profile to be used for a provisioning by performing a second decoding using the private key corresponding to its public key after the first decoding. The private key is already known in the manufacturing step or from the dynamic generation procedure as explained above. At this time, the eUICC may make an electronic signature using the public key of the SM-DP for checking a certificate (that is, for checking whether the profile is the eUICC profile generated from the SM-DP corresponding to the public key obtained from the MNO). Also, the effectiveness of the certificate may be checked by a trustworthy third-party.

In the step S370, the SM-SR database may be updated based on status requests and corresponding responses between the eUICC which finished the provisioning and the SM-SR.

Main configurations for the above-described steps are explained as follows.

In the step S310, the eUICC identification information (eICCid, etc.) is open data, and integrated and protected in the eUICC.

In the steps S320 and S330, the status request and the technical capability control may provide verification on the eUICC identity (that is, verification on whether the eUICC is trustable or not), and should be able to verify a feasibility of a characteristic of the eUICC for an MNO service.

In the steps S340 to S360, a double ciphering mechanism is used for generating and transmitting the eUICC profile. In other words, the profile which is linked to the eUICC by the SM-DP is ciphered by a ciphering mechanism which can be read by the target eUICC. Also, an electronic signature may be made by the SM-DP for verifying that the profile has been generated by the right SM-DP. Also, the SM-SR may encrypt the generated profile using the eUICC management key so as to authenticate and protect the profile during delivery.

In the step 370, the SM-SR database may be updated at a final stage of the subscription installation.

Figure 4:
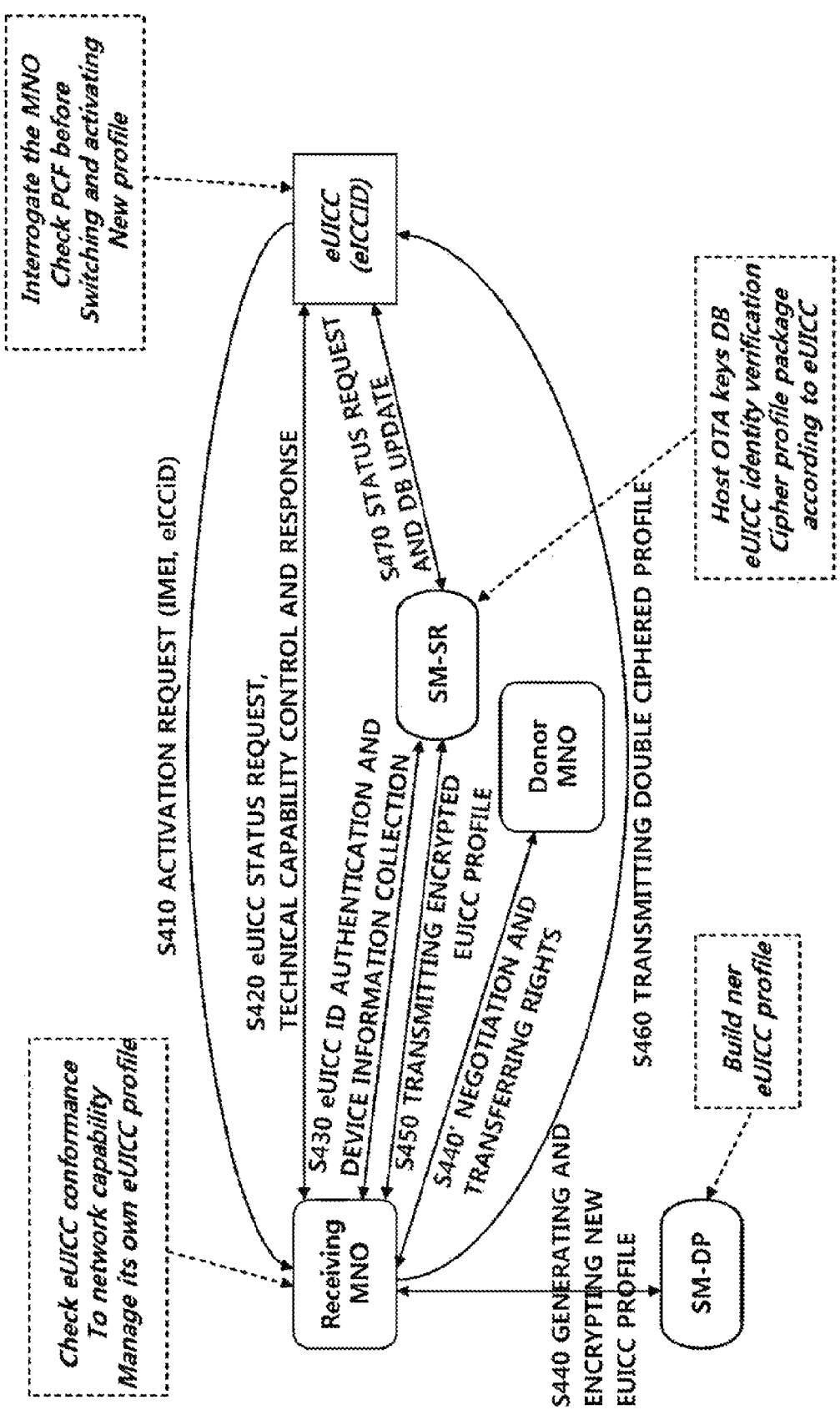
FIG. 4 is a flow chart explaining a procedure for subscription change or MNO change to which the present invention is applied.

FIG. 4 is a flow chart explaining a procedure for subscription change or MNO change to which the present invention is applied.

Generally, the procedure of FIG. 4 is similar to the provisioning procedure of FIG. 3. That is, a new MNO of FIG. 4, after changed, corresponds to an MNO of FIG. 3. The difference between two procedures is that the new MNO performs a procedure of negotiating and transferring right with a donor MNO before or after generation of a profile for the new MNO (at S440').

That is, the difference between an MNO change procedure of FIG. 4 and the provisioning procedure of FIG. 3 is that an activation request is transmitted using a provisioning profile or an operational active profile through a donor MNO OTA bearer, and the new MNO requests a path from the SM-SR in order to download a new profile through one of OTA and OTI.

The MNO change procedure of FIG. 4 is explained in detail as follows.

For changing an MNO, an eUICC may transmit an activation request including device identification information (IMEI, etc.) and eUICC identification information (eICCid, etc.) to a receiving MNO which is to be changed (at S410). Then, an eUICC status request and a technical capability control are performed between the receiving MNO and the eUICC (at S420).

In a step S430, the receiving MNO may perform an eUICC identity verification and collect information about the device (eUICC) by interworking with the SM-SR. Also, according to an example embodiment of the present invention, the MNO may obtain an encryption key for the corresponding eUICC, specifically, a public key corresponding to the eUICC from a SM-SR.

The obtaining the public key may be performed statically or dynamically. When the obtaining is performed statically, a public key and a private key can be generated in the eUICC in the manufacturing step of the eUICC. Specifically, a CCP in the eUICC may generate the public key and the private key. The private key may be stored in the eUICC, and the public key may be shared by all SM-SRs so that all the SM-SRs can recognize the public key for the eUICC and a SM-SR corresponding to the eUICC can transmit the public key for the eUICC to the MNO in response to a request of the MNO.

The dynamic method of obtaining an encryption key is identical to the method which was explained by referring to FIG. 3. Thus, a redundant explanation is omitted.

The receiving MNO which obtained the public key (the encryption key) of the corresponding eUICC generates a new eUICC profile corresponding to the MNO through the SM-DP, encrypts the profile by using the obtained public key (the encryption key), and delivers the profile to the MNO (a first encryption; S440). At this time, the SM-DP may generate an additional electronic signature using its private key in order to provide authenticity. That is, in the step S440, the SM-DP may make an electronic signature on the profile by using its private key or secret key for authentication.

Also, a step S440' of negotiating and transferring right may be performed before or after the step S440. This step S440' is a procedure in which the receiving MNO requests the previous MNO (the donor MNO) to verify whether the eUICC is right or not and to transfer rights (information) according to the change of MNO.

In other words, in the step S440', the new receiving MNO may request authentication on the donor MNO for the subscription switching, and this authentication may be provided through a policy control function.

Then, the receiving MNO may deliver the first encrypted eUICC profile to the SM-SR, and request a second encryption. The SM-SR may perform the second encryption on the eUICC profile by using the eUICC management key (such as an eUICC OTA key, a GP ISD key, etc.) which has been already stored, and deliver the second encrypted profile to the MNO (at S450).

Then, the MNO may transmit the double ciphered eUICC profile to the corresponding eUICC (at S460). At this time, the public key of the SM-DP or a certification may be transmitted to the eUICC with the eUICC profile in order to provide authenticity.

Since the eUICC already knows the eUICC management key, the eUICC may completely decode the profile to be used for change of MNO by performing a second decoding using the private key corresponding to its public key after the first decoding. At this time, the eUICC may make an electronic signature using the public key of the SM-DP for checking a certificate (that is, for checking whether the profile is the eUICC profile generated from the SM-DP corresponding to the public key obtained from the MNO). Also, the effectiveness of the certificate may be checked by a trustworthy third-party.

It the step S470, the SM-SR database may be updated based on status requests and corresponding responses between the eUICC which finished the provisioning and the SM-SR.

On the other hand, for performing a procedure of provisioning or MNO change in the above described system in which an eUICC, a plurality of MNO systems and SMs are related to each other, only a method of checking an ID of an eUICC, encrypting and delivering a necessary profile is being discussed. Thus, a procedure of verifying or authenticating an identity of an eUICC may be needed in order to check whether the eUICC is a trustable entity or not.

Therefore, in an example embodiment of the present invention, under the above described eUICC system architecture, an MNO system or a SM may store eUICC certificate information needed for performing verification on the identity of the eUICC, and transmit the eUICC certificate information to the MNO system or the SM during the procedure of provisioning or MNO change. The MNO system or the SM may verify the identity of the eUICC using the received eUICC certificate information, encrypt an MNO operational profile, and transmit it to the eUICC only when the identity of the eUICC is verified.

At this time, the eUICC certificate information may be one of the followings. The detail form or type of the information is not limited to a specific form or type.

1) information notifying that one of hardware, card OS, and a platform of the eUICC has been verified, 2) information notifying that the eUICC has been verified as an eUICC trustable for the MNO system or the SM, and 3) information notifying that the MNO system is verified to be able to equip MNO services.

In other words, in conventional methods shown in FIGS. 1 to 4, a receiving MNO, which received a request of MNO change, obtains information for verifying an identity of an eUICC which requested the MNO change, that is, eUICC certificate information and device information, from a SM (specifically, a SM-SR), and reports a change of subscriber to a donor MNO finally. For the above conventional method, a SM-SR related to the receiving MNO should be in state of identifying information for verifying an identity of the eUICC and device information in advance when an eUICC belonging to the donor MNO requests to change its operator to the receiving MNO. For this, there can be a problem that numerous SM-SRs should share all corresponding information.

In order to overcome the above-mentioned problem, in an example embodiment of the present invention, the MNO or the SM stores information for verifying a specific eUICC, that is, eUICC certificate information, in the eUICC previously or dynamically. The eUICC certificate information is information for proving that the eUICC is an eUICC trustable to the MNO and the SM or that the eUICC is suitable for services provided by the MNO, and may be issued by an arbitrary entity in the circle of trust as shown in FIG. 1.

Figure 5:
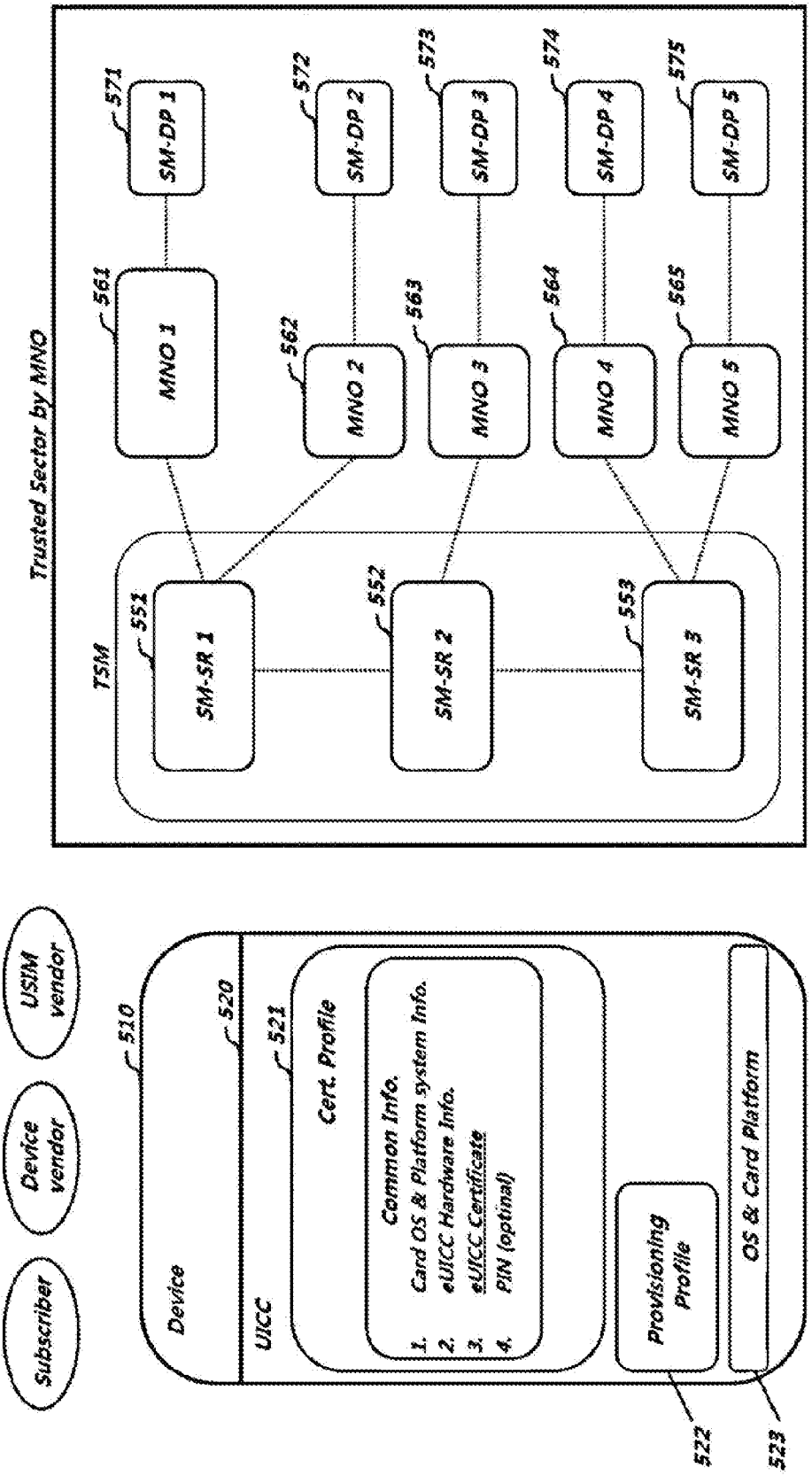
FIG. 5 illustrates a configuration of an entire system according to an example embodiment of the present invention.

FIG. 5 illustrates a configuration of an entire system according to an example embodiment of the present invention.

As shown in FIG. 5, the entire system according to an example embodiment of the present invention may include a device 510, an eUICC 520 which is installed in the device, a trusted sector comprising a plurality of external MNO systems, SM-SRs, and SM-DPs.

As shown in FIG. 5, each sector may be formed by the MNOs based on strong trust relationships, and each dotted line in FIG. 5 represents a strong trust relationship.

The SM-SR may be operated directly by MNOs, or operated in networks of the MNOs in form of TSM with the MNOs based on strong trust between them. Also, trust relationship between the SM-SRs may be formed, and each SM-SR may be related to a plurality of MNOs. The SM-SR is an entity which actually processes a subscription request, and loads an MNO profile to the eUICC via OTA.

The SM-DP may be operated directly by MNOs, or operated in networks of the MNOs in form of TSM with the MNOs based on strong trust between them. However, it is preferred that the SM-DP is operated directly by MNOs. The SM-DP may generate, store, and manage the MNO profile.

At this time, an internal structure of an eUICC according to an example embodiment of the present invention is illustrated in a left portion of FIG. 5. In the example embodiment of the present invention, eUICC certificate information and eUICC certificate profile are newly defined. However, they are not limited to the terminologies, and can be represent as other terminologies when they have meanings identical to the following descriptions.

The eUICC certificate profile is a module for managing security and the eUICC certificate in the eUICC.

In the example embodiments of the present invention, the eUICC certificate may include the following information as information which can be included in common information such as card operating system (OS) information, card platform information, etc.

1) information indicating that hardware, card OS, card platform, etc. of the eUICC have been verified.

2) information indicating that the eUICC has been verified as an eUICC trustable to the MNO and the SM in advance.

3) information indicating that the eUICC comprises software with no problems for installing MNO services.

That is, in the example embodiments of the present invention, the eUICC certificate means all information which can be used for performing identity verification on a specific eUICC between the MNO and the SM-SR.

If the above described eUICC certificate is used, an eUICC mechanism, in which an overhead of sharing eUICC verification information between all different SM-SRs can be removed and security can be guaranteed, may be provided.

On the other hand, a Personal Identification Number (PIN) is information which is used optionally, means a password, and may be included in the certificate profile optionally.

That is, as shown in the left portion of FIG. 5, the certificate profile 521 according to an example embodiment of the present invention is a profile including selectively at least one of card OS information, card platform information, an eUICC certificate, and a PIN. The certificate profile is implemented in the eUICC.

In other words, the eUICC certificate according to an example embodiment of the present invention is stored in form of an eUICC certificate profile as one of common information. The common information may include card OS information, card platform information, eUICC hardware information, PIN information, and the like in addition to the eUICC certificate.

Figure 6:
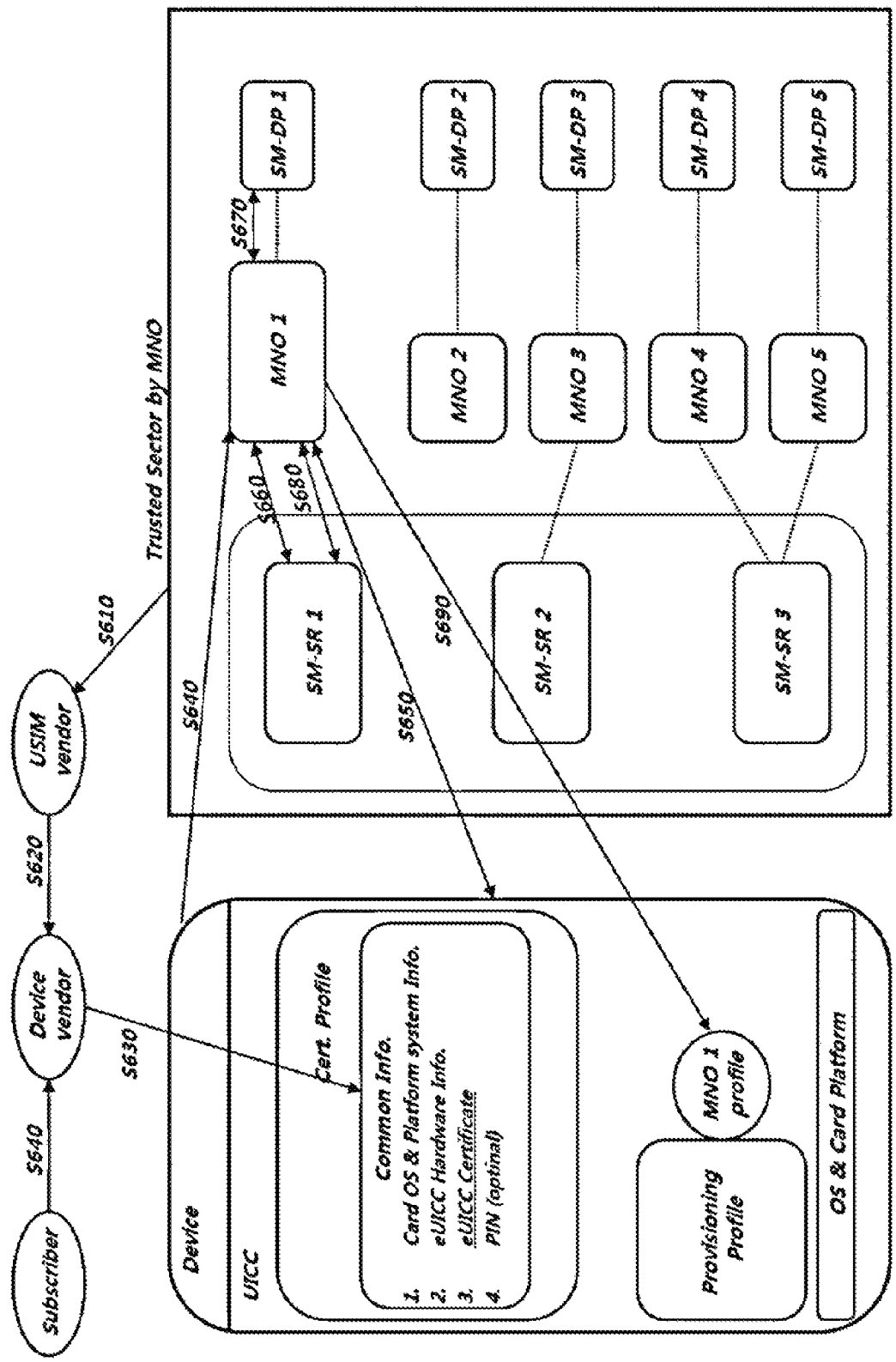
FIG. 6 illustrates a first provisioning procedure using an eUICC certificate according to an example embodiment of the present invention.

FIG. 6 illustrates a first provisioning procedure using an eUICC certificate according to an example embodiment of the present invention.

Referring to FIG. 6, first, in a procedure of pre-provisioning or provisioning, an eUICC or USIM manufacturer system may be issued an eUICC certificate on eUICC hardware and software from a predetermined entity in a trust sector, and install it in the eUICC with other information about a card OS and eUICC hardware (at S610).

Then, in a step S620, an eUICC including the eUICC certificate is provided to a device vendor so that the device vendor can install the eUICC into a terminal manufactured by the device vendor.

Then, as shown in a step S630, the eUICC certificate according to an example embodiment of the present invention is stored with other common information in the eUICC as an eUICC certificate profile.

Then, a subscriber who purchased the terminal may request opening or provisioning to an MNO1 system (at S640). At this time, the request may be transmitted to the MNO1 network through a provisioning profile which is previously installed and shown in FIG. 5. However, the request may be transmitted via offline or online (for example, a dedicated line).

When there in the request of subscribing or provisioning, the eUICC may provide common information including at least one of card OS information, card platform information, eUICC hardware information, an eUICC certificate, and PIN information to the MNO1 system through an eUICC certificate profile (at S650). Meanwhile, in the step S650, the eUICC may provide an encryption key used for encrypting a profile in addition to the common information. The encryption key may be an eUICC public key, an MNO profile key, etc. The encryption key is used when the MNO encrypts primarily and transmits its profile. The format of the encryption key is not restricted to a specific format.

Then, in a step S660, the MNO1 system may verify identity of the corresponding eUICC using the eUICC certificate, and check various common information. Also, the MNO1 system may be provided an MNO1 OTA key from a SM-SR1 only when the identity is verified. The MNO OTA key is used for secondary encryption in addition to the encryption key provided in the above described step S650, and may have a different representation or format.

Then, the MNO1 system may generate an MNO1 profile through a SM-DP1, and encrypt the MNO1 profile primarily using the MNO1 profile key received in the step S650 (at S670). Also, the MNO1 system may encrypt the MNO1 profile using the MNO1 OTA key secondarily autonomously or through the SM-SR1 (at S680). That is, the MNO1 profile is doubly ciphered through the above procedure.

The MNO1 system may transmit the double ciphered MNO1 profile to the eUICC through an OTA (at S690).

Accordingly, the procedure of provision may be completed. Through the above procedure, the MNO1 may perform verification on the corresponding eUICC by using the eUICC certificate.

Figure 7:
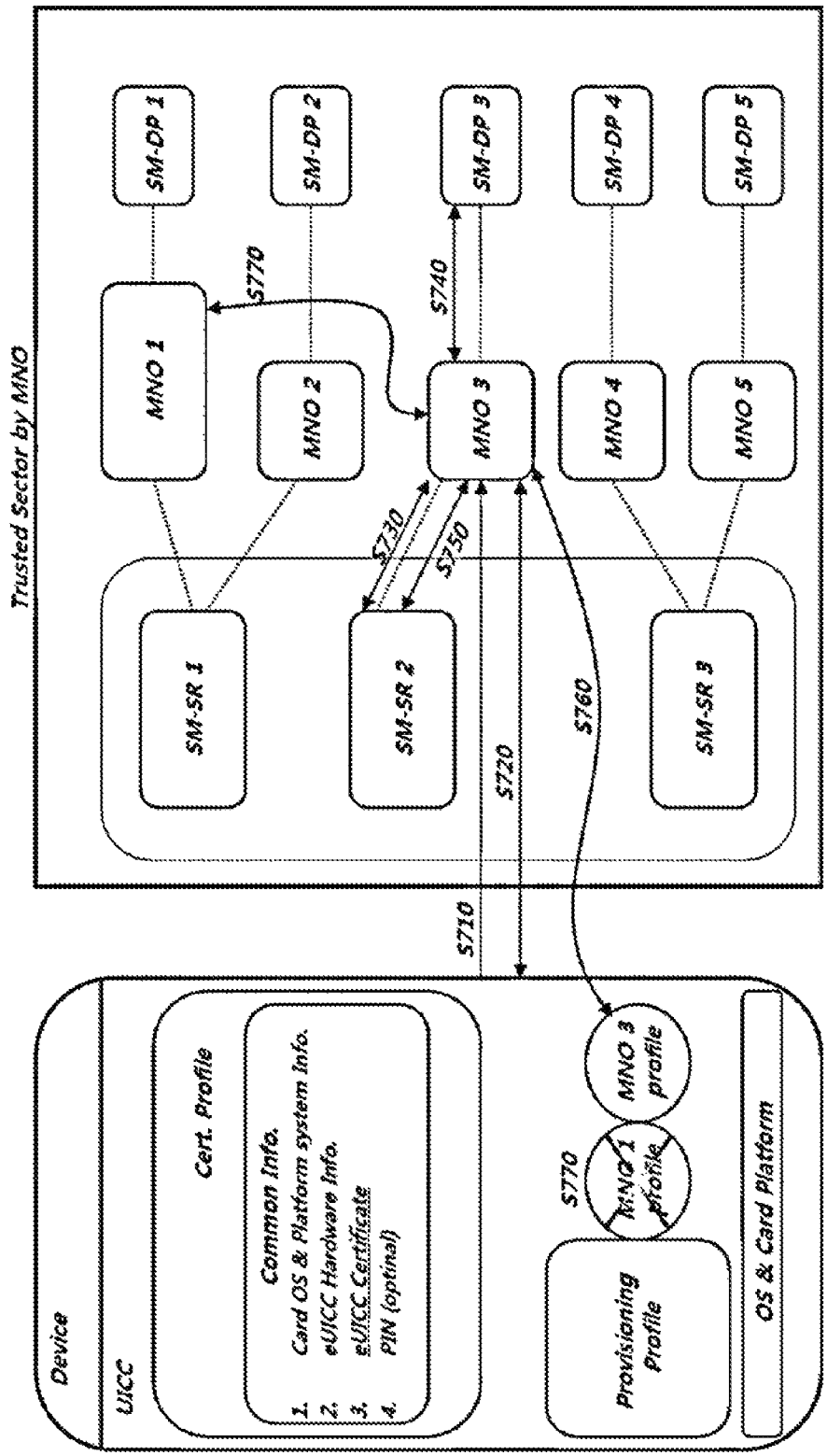
FIG. 7 illustrates a procedure of changing MNO by using an eUICC certificate and certificate profile according to the present invention.

FIG. 7 illustrates a procedure of changing MNO by using an eUICC certificate and certificate profile according to the present invention.

First, it is supposed that a subscriber performs a subscription change from an MNO1 of a SM-SR1 to an MNO3 of a SM-SR2.

Then, the subscriber may request a subscription change or an MNO change to an MNO3 system, a receiving MNO which will be an MNO after change (at S710). At this time, the request may be transmitted to a network of the MNO3 through a pre-installed provisioning profile shown in FIG. 5, or may be transmitted via off-line or on-line (using a dedicated line).

When there is a subscription change request or an MNO change request, the eUICC may provide common information, including information about at least one of card OS information, card platform information, eUICC hardware information, an eUICC certificate, and PIN information, to the MNO3 system (the receiving MNO) through the eUICC certificate profile (at S720). Of course, similarly to the step S650, an encryption key which is used for the eUICC to encrypt a profile may also be provided in the step S720. The encryption key may be an eUICC public key, an MNO profile key, etc. The encryption key may be used for the MNO to encrypt its profile primarily and transmit it. There is no restriction in a format of the encryption key.

Then, in a step S730, the receiving MNO3 system may verify identity of the corresponding eUICC using the eUICC certificate, and check various common information. Also, the MNO3 system may be provided an MNO1 OTA key from the SM-SR2 only when the identity is verified. The MNO OTA key is used for secondary encryption in addition to the encryption key provided in the above described step S720, and may have a different representation or format.

Then, the receiving MNO3 system may generate an MNO3 profile through a SM-DP3, and encrypt the MNO3 profile primarily using the encryption key received in the step S720 (at S740). Also, the MNO3 system may encrypt the MNO3 profile using the MNO3 OTA key secondarily autonomously or through the SM-SR2 (at S750). That is, the MNO3 profile is doubly ciphered through the above procedure.

The receiving MNO3 system may transmit the double ciphered MNO3 profile to the eUICC through an OTA (at S760).

Then, the eUICC may notify a message indicating that the subscription change from the donor MNO1 to the receiving MNO3 is completed to the donor MNO1 and the receiving MNO3. The donor MNO1 and the receiving MNO3 may check the completion of MNO change finally by verifying a change of identity of the eUICC and the eUICC by using the eUICC certificate of the eUICC (at S770). Also, the eUICC may deactivate or delete a profile of the donor MNO existing in the eUICC, and activated a profile of the receiving MNO in the step S770.

Through the above procedures, an MNO system or a SM can verify identity of the eUICC before transmitting various profiles to the eUICC so that reliability of the eUICC may be guaranteed.

Example embodiments of FIGS. 8 and 9 represent cases in which a provision procedure and an MNO change procedure using an eUICC certificate according to the present invention are applied to methods illustrated in FIGS. 3 and 4.

FIG. 8 illustrates a provisioning procedure using an eUICC certificate according to another example embodiment of the present invention.

FIG. 8 illustrates an example in which an eUICC certificate according to an example embodiment of the present invention is used for a provisioning procedure. In the manufacturing step of a device or an eUICC, a device vendor or an eUICC vendor receives certification of the eUICC from a specific entity of the circle of trust (at S810), and stores it in the eUICC (at S820). At this time, the entity in the circle of trust generating or issuing the eUICC certificate may be one of a device vendor system, an eUICC vendor system, an MNO system, a SM, etc. However, the entity is not limited to a specific entity. Other authorization organization may be used as the entity.

When a subscriber who purchased a terminal or a device equipped with the eUICC requests an opening (at S830), the eUICC may transmit an activation request or an opening request message including an IMEI and an eICCiD, to the corresponding MNO1 system (at S840).

Then, the corresponding MNO1 system may perform eUICC status request and technical capability control by interworking with the eUICC. At the same time, the MNO1 system may obtain an eUICC certificate from the eUICC (at S850).

When the MNO1 collects information related to the device or the eUICC from a SM-SR, the eUICC certificate obtained in the step S850 may be transmitted to the SM-SR, and the identity of the eUICC may be verified (at S860).

A provisioning procedure after the above verification may be performed similarly to the steps S340 to S370 of FIG. 3.

That is, when the identity of the eUICC is verified through the eUICC certificate, the MNO1 system may generate a profile through a SM-DP, and encrypt the profile primarily using an encryption key (an eUICC public key, etc.). Also, the MNO1 system may encrypt the profile using an eUICC management key (such as an eUICC OTA key, a GP ISD key, etc.) secondarily, through a SM-SR, and transmit the encrypted profile to the eUICC.

Then, the eUICC may perform a first and a second decryption on the double ciphered profile, and complete the provisioning procedure. After the completion of the provisioning procedure, the SM-SR database may be updated through status requests and responses to them between the eUICC and the SM-SR.

FIG. 9 illustrates a procedure of MNO change using an eUICC certificate according to another example embodiment of the present invention.

First, in the manufacturing step of a device or an eUICC, a device vendor or an eUICC vendor receives certification of the eUICC from a specific entity of the circle of trust, and stores it in the eUICC (S910 to S930). The above procedure is identical to that of the steps S810 and S820 in the provisioning procedure of FIG. 8.

At this time, if a subscriber requests an MNO change from a donor MNO (MNO1) to a receiving MNO (MNO2), the eUICC may transmit an activation request or an opening request message including an IMEI and a eICCId, to the corresponding MNO2 system (at S940).

Then, the receiving MNO2 system may perform eUICC status request and technical capability control by interworking with the eUICC. At the same time, the MNO2 system may obtain an eUICC certificate from the eUICC (at S950)

When the MNO2 collects information related to the device or the eUICC from a SM-SR, the MNO2 may transmit the eUICC certificate obtained in the step S950 to a SM-SR2 (a SM-SR connected to the MNO2), and verify the identity of the eUICC (at S960).

Then, the receiving MNO2 may perform a procedure of negotiation and transferring rights with the MNO1 (the donor MNO). In the procedure, verification through the eUICC certificate between the two MNOs may be performed additionally (at S970).

A provisioning procedure after the above procedure may be performed similarly to the steps S440 to S470 of FIG. 4.

That is, when the identity of the eUICC is verified through the eUICC certificate, the receiving MNO2 system may generate a profile through the SM-DP2, and encrypt the profile primarily using an encryption key (an eUICC public key, etc.). Also, the MNO2 system may encrypt the profile using an eUICC management key (such as an eUICC OTA key, a GP ISD key, etc.) secondarily, through the SM-SR2, and transmit the encrypted profile to the eUICC.

Then, the eUICC may perform a first and a second decryption on the double ciphered profile, and complete the provisioning procedure. After the completion of the provisioning procedure, the SM-SR database may be updated through status requests and responses to them between the eUICC and the SM-SR2.

As described above, in an entire eUICC system (a trusted sector) in which MNOs and SM-SRs are connected reliably, an eUICC certificate as information to be used for performing identity verification on a specific eUICC is defined. Also, by using a certificate profile processing the eUICC profile, the effect, that verification on the eUICC can be performed in a procedure of subscription or MNO change for a terminal equipped with the eUICC, can be achieved.

Also, although detail description is omitted for avoiding redundant explanations, the above-mentioned eUICC using eUICC certificate, MNO system, and methods for provisioning and MNO change may be implemented as a program As such, in order for a computer to read the program, which is recorder on a recording medium, and execute the above mentioned various functions, the above-mentioned computer program can include a code encoded by computer languages, such as C, C++, JAVA, machine languages, which can be read by a computer processor (CPU).

Such a code can include a function code related to functions, etc., which define the above-mentioned functions, and can also include an execution procedure-related control code necessary for a computer processor to execute the above-mentioned functions according to a predetermined procedure.

In addition, such a code can further include a memory reference-related code regarding in which position (address) of an internal or external memory of a computer should additional information or media, which is necessary for a computer processor to execute the above-mentioned function, be referenced.

Furthermore, when communication with another computer or server at a remote location is necessary for a computer processor to execute the above-mentioned functions, the code can further include a communication-related code regarding how the computer processor should communicate with the other computer or server at a remote location using a communication module (e.g. wired and/or wireless communication module) of the computer, or what information of media needs to be transmitted/received during communication.

Furthermore, a functional program for implementing the present invention and a code and a code segment related with it can be easily inferred or modified by programmers in the technical field of the present invention, by considering the system environment, etc. of the computer that reads a recording medium ad executes the program.

Examples of a computer-readable recording medium, in which the above-mentioned program is recorded, include ROMs, RAMs, CD-ROMs, magnetic tape, floppy disks, optical media storage devices, etc.

In addition, a computer-readable recording medium, in which the above-mentioned program is recorder, can be distributed over a system of computers connected via a network, so that a computer-readable code can be stored and executed in a distributed manner. In this case, at least one of a number of distributed computers can execute some of the functions presented above; the execution result can be transmitted to at least one of the other distributed computers; and the computer, which has received the result, can also execute some of the functions presented above and provide other distributed computers with the result.

Especially, a computer-readable recording medium, in which a program (application) for executing various functions or methods related to eUICC certificate according to an example embodiment of the present invention is recorded, can be a storage medium (e.g. hard disk) included in an application provider server, including an application store server, a web server related to the application or corresponding service, etc.; can be the application provider server itself.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinary skilled person in the technical field of the present invention. Such a computer program may implement the embodiments of the present invention by being stored in a computer readable storage medium, and being read and executed by a computer. A magnetic recording medium, and optical recording medium, or the like may be employed as the storage medium of the computer program.

In addition, since terms, such as "including", "comprising", and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of certifying an embedded universal integrated circuit card (eUICC) cooperating with a mobile network operator (MNO) system and a subscription manager (SM), the method comprising:
   storing, by the eUICC, an eUICC certificate used for the MNO system or the SM to verify an identity of the eUICC; and
   transmitting, by the eUICC, the eUICC certificate to the MNO system or the SM,
   wherein the SM comprises a subscription manager-secure routing (SM-SR) and a subscription manager-data preparation (SM-DP), both of which perform an encryption function such that the eUICC certificate is double encrypted upon a condition that both the SM-SR and SM-DP are instructed to perform said encryption.

2. The method of claim 1, wherein the eUICC certificate includes at least one of information indicating that at least one of hardware, card operating system (OS), and platform of the eUICC is verified, information indicating that the eUICC is verified as an eUICC trustable by the MNO system and the SM, and information indicating that it is verified that MNO services can be installed in the MNO system.

3. The method of claim 1, wherein the eUICC certificate in included and stored in common information comprising card OS information and card platform information.

4. The method of claim 3, wherein the common information including the eUICC certificate is included in an eUICC certificate profile.

5. The method of claim 3, wherein the common information further includes a personal identification number (PIN) of the eUICC.

6. An embedded universal integrated circuit card (eUICC) cooperating with an external entity including a mobile network operator (MNO) system and a subscription manager (SM),
   wherein the eUICC stores an eUICC certificate profile including at least one of an eUICC certificate, which is used for the MNO system or the SM to verify an identity of the eUICC, card operating system (OS) information, card platform information, personal identification number (PIN) information,
   wherein the eUICC certificate profile transmits the eUICC certificate to the MNO system or the SM, and
   wherein the SM comprises a subscription manager-secure routing (SM-SR) and a subscription manager-data preparation (SM-DP), both of which perform an encryption function such that the eUICC certificate profile is double encrypted upon a condition that both the SM-SR and SM-DP are instructed to perform said encryption.

7. The eUICC of claim 6, wherein the eUICC certificate includes at least one of information indicating that at least one of hardware, card operating system (OS), and platform of the eUICC is verified, information indicating that the eUICC is verified as an eUICC trustable by the MNO system and the SM, and information indicating that it is verified that MNO services can be installed in the MNO system.

8. A method of provisioning an eUICC certificate which is used for a mobile network operator (MNO) system and a subscription manager (SM) to verify an identity of the eUICC by using the eUICC cooperating with an external entity including the MNO system and the SM, the method comprising:
   receiving and storing, by the eUICC, the eUICC certificate generated in a manufacturing step of the eUICC;
   transmitting, by the eUICC, the eUICC certificate to the MNO system;
   verifying, by the MNO system, the identity of the eUICC by using the eUICC certificate; and
   encrypting, by the MNO system, its operational profile and transmitting the operational profile to the eUICC,
   wherein the SM comprises a subscription manager-secure routing (SM-SR) and a subscription manager-data preparation (SM-DP), both of which perform an encryption function such that the eUICC certificate is double encrypted upon a condition that both the SM-SR and SM-DP are instructed to perform said encryption.

9. The method of claim 8, wherein the eUICC certificate includes at least one of information indicating that at least one of hardware, card operating system (OS), and platform of the eUICC is verified, information indicating that the eUICC is verified as an eUICC trustable by the MNO system and the SM, and information indicating that it is verified that MNO services can be installed in the MNO system.

10. A method of changing MNO using an eUICC cooperating with an external entity including a mobile network operator (MNO) system and a subscription manager (SM) and including an eUICC certificate which is used for the MNO system and the SM to verify an identity of the eUICC, the method comprising:
   receiving and storing, by the eUICC, the eUICC certificate generated in a manufacturing step of the eUICC;
   transmitting, by the eUICC, the eUICC certificate to a receiving MNO system;
   verifying, by the receiving MNO system, the identity of the eUICC by using the eUICC certificate;
   encrypting, by the receiving MNO system, its operational profile and transmitting the operational profile to the eUICC; and
   notifying, by the eUICC, a fact that an MNO is changed, to the receiving MNO system and a donor MNO system,
   wherein the SM comprises a subscription manager-secure routing (SM-SR) and a subscription manager-data preparation (SM-DP), both of which perform an encryption function such that the eUICC certificate is double encrypted upon a condition that both the SM-SR and SM-DP are instructed to perform said encryption.

11. The method of claim 10, wherein the eUICC certificate includes at least one of information indicating that at least one of hardware, card operating system (OS), and platform of the eUICC is verified, information indicating that the eUICC is verified as an eUICC trustable by the MNO system and the SM, and information indicating that it is verified that MNO services can be installed in the MNO system.

12. A method of provisioning by using an embedded universal integrated circuit card (eUICC) cooperating with a mobile network operator (MNO) system, a subscription manager-data preparation (SM-DP) and a subscription manager-secure routing (SM-SR) constituting a subscription manager (SM), the method comprising:
   receiving and storing, by the eUICC, an eUICC certificate which can verify an identity of the eUICC, from an eUICC manufacturer system or a terminal manufacturer system, in the eUICC;
   transmitting an activation request message or an opening request message to the MNO system according to an opening request of a subscriber;
   receiving, by the MNO system, the eUICC certificate when the MNO system performs status requests and technical capability control for the eUICC;
   transmitting, by the MNO system, the eUICC certificate to the SM-SR when the MNO system collects information related to a terminal from the SM-SR; and
   encrypting, by the MNO system, its operational profile and transmitting the operational profile to the eUICC only when the MNO system or the SM-SR verifies the eUICC using the eUICC certificate,
   wherein both the SM-SR and the SM-DP perform an encryption function such that the eUICC certificate is double encrypted upon a condition that both the SM-SR and SM-DP are instructed to perform said encryption.

13. The method of claim 12, wherein the eUICC certificate includes at least one of information indicating that at least one of hardware, card operating system (OS), and platform of the eUICC is verified, information indicating that the eUICC is verified as an eUICC trustable by the MNO system and the SM, and information indicating that it is verified that MNO services can be installed in the MNO system.

14. A method of changing MNO by using an embedded universal integrated circuit card (eUICC) cooperating with a mobile network operator (MNO) system, a subscription manager-data preparation (SM-DP) and a subscription manager-secure routing (SM-SR) constituting a subscription manager (SM), the method comprising:
   receiving and storing, by the eUICC, an eUICC certificate which can verify an identity of the eUICC, from an eUICC manufacturer system or a terminal manufacturer system, in the eUICC;
   transmitting, by the eUICC, an activation request message or an opening request message to a receiving MNO system according to an MNO change request;
   receiving, by the receiving MNO system, the eUICC certificate from the eUICC when the receiving MNO system performs status requests and technical capability control for the eUICC;
   transmitting, by the receiving MNO system, the eUICC certificate to the SM-SR when the receiving MNO system collects information related to a terminal from the SM-SR;
   performing, by the receiving MNO system, negotiation and transferring right for MNO change with a donor MNO system; and
   encrypting, by the receiving MNO system, its operational profile and transmitting the operational profile to the eUICC, only when the receiving MNO system or the SM-SR verifies the eUICC using the eUICC certificate, wherein both the SM-SR and the SM-DP perform an encryption function such that the eUICC certificate is double encrypted upon a condition that both the SM-SR and SM-DP are instructed to perform said encryption of the eUICC certificate.

15. The method of claim 14, wherein the eUICC certificate includes at least one of information indicating that at least one of hardware, card operating system (OS), and platform of the eUICC is verified, information indicating that the eUICC is verified as an eUICC trustable by the MNO system and the SM, and information indicating that it is verified that MNO services can be installed in the MNO system.

16. The method of claim 10, wherein the donor MNO system is a previous system of the eUICC prior to the receiving MNO.

* * * * *